(12) United States Patent
Ehmann et al.

(10) Patent No.: US 7,020,807 B2
(45) Date of Patent: Mar. 28, 2006

(54) DATA COMMUNICATION BUS TRAFFIC GENERATOR ARRANGEMENT

(75) Inventors: Gregory E. Ehmann, Sleepy Hollow, IL (US); Neil Gregie, Schaumberg, IL (US); Arjan Bink, Chicago, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 603 days.

(21) Appl. No.: 09/955,704

(22) Filed: Sep. 19, 2001

(65) Prior Publication Data

US 2003/0056052 A1  Mar. 20, 2003

(51) Int. Cl.
*G06F 11/00* (2006.01)

(52) U.S. Cl. .................... 714/43; 714/47; 714/738

(58) Field of Classification Search .............. 714/43, 714/41, 715, 716, 717, 738, 739, 73
See application file for complete search history.

(56) References Cited

U.S. PATENT DOCUMENTS

| | | | | |
|---|---|---|---|---|
| 5,228,042 A * | 7/1993 | Gauthier et al. | ............ | 714/716 |
| 6,226,766 B1 * | 5/2001 | Harward | ................ | 714/719 |
| 6,249,893 B1 * | 6/2001 | Rajsuman et al. | .......... | 714/741 |
| 6,292,911 B1 * | 9/2001 | Swanson | ................ | 714/715 |
| 6,424,926 B1 * | 7/2002 | Mak | ........................ | 702/117 |
| 6,581,168 B1 * | 6/2003 | Goh et al. | ................ | 714/43 |
| 6,625,686 B1 * | 9/2003 | Hasegawa et al. | .......... | 711/104 |
| 6,625,688 B1 * | 9/2003 | Fruehling et al. | .......... | 711/109 |
| 2002/0087932 A1 * | 7/2002 | Ojha et al. | ................ | 714/739 |
| 2002/0138678 A1 * | 9/2002 | Kim et al. | ................ | 710/240 |

* cited by examiner

*Primary Examiner*—Robert Beausoliel
*Assistant Examiner*—Yolanda L Wilson
(74) *Attorney, Agent, or Firm*—Peter Zawilski

(57) ABSTRACT

A circuit arrangement including a test-traffic generator, and adapted to communicate test-traffic onto a digital data path having other traffic sources. A first embodiment includes a data-generation circuit, a memory arrangement, state machine circuitry, and a status and feedback circuit. The memory arrangement stores a plurality of programmable commands indicative the type, pattern and behavior-in-time of the test-traffic. The data-generation circuit provides a data stream to the state machine circuitry, where the state machine assembles portions of the data stream into test-traffic having type, pattern and behavior-in-time characteristics selected responsive to the programmable commands. The state machine generates test-traffic on the digital data path. The status and feedback circuit monitors the digital data path for test-traffic, verifies the test-traffic against the data stream, and generates a feedback signal indicative of test-traffic quality or throughput. In another aspect of the present invention, a computer system includes a test-traffic generator.

28 Claims, 2 Drawing Sheets

DATA COMMUNICATION BUS TRAFFIC GENERATOR ARRANGEMENT

FIELD OF THE INVENTION

The present invention is directed to data communication and, more particularly, the present method relates to methods and arrangements for testing data-based events on a digital data path.

BACKGROUND

Computer arrangements, including microprocessors and digital signal processors, have been designed for a wide range of applications and have been used in virtually every industry. Significant advancements are continually sought in circuit miniaturization, performance and speed through the development of very large-scale integrated circuits. These complex circuits are often designed as a plurality of functional units interconnected by a shared digital data communications path, each functional unit processing a set, or packet, of data, then passing the processed data on to other functional units for further data manipulations. A functional unit is often a source of new data, generated in response to received data or commands.

Data packets in large and small quantities are communicated between functional units, for example, between individual discrete circuits, between integrated circuits on a common chip, or between remotely-located circuits coupled to or within various parts of a system or subsystem. Regardless of the configuration, the communication typically requires closely-controlled interfaces that are designed to ensure that data integrity is maintained while using circuit designs are sensitive to practicable limitations in terms of implementation space and available operating power. An increased demand for high-speed semiconductor devices must address not only performance of the functional units themselves, but also the speed and efficiency by which data is passed between the functional units.

Typically, digital data paths are implemented using parallel data transmission channels, or busses. Multiple data bits are sent simultaneously over "parallel bussing," a well-accepted approach for achieving higher data transfer rates. A typical parallel digital-data path is implemented in various forms, including a cable, a backplane circuit, a bus structure internal to a chip, other interconnect, or any combination of such communication media. The plurality of digital data packets, moving between functional units sharing the digital data path, are collectively referred to as "traffic," distantly analogous to vehicular traffic sharing a common highway interconnecting numerous geographic destinations. However, in parallel communications, only one device can communicate over the digital data path at a time; the device essentially commandeers the entire digital data path and broadcasts data to every other device. Those devices needing the broadcast data accept it, and those not needing the broadcast data ignore it.

Computer system modifications sometimes increase communication traffic to an existing digital data path. This increase is helpful to test an existing system prior to finalizing (and frequently prior to beginning) design of modification to determine if the system can support additional bus traffic, and the extent to which additional bus traffic is tolerable. Additionally, performance of the modification's effect on the digital data path and/or the modification's effect on the balance of the system are conventionally tested as an integral step of a design process. For example, one testing method includes loading the digital data path with additional bus traffic simulating a proposed modification's new use of the digital data path, and evaluating system performance under the loaded conditions.

Currently, a system designer's options for simulating additional bus traffic are limited to routing the new bus traffic through the system's microprocessor, or an unoccupied direct memory access (DMA) channel. These options include inherent limitations on the type and amount of bus traffic that can be generated through each particular traffic source. Frequently, a DMA channel is not available and system microprocessors are generally already fully utilized performing other processing operations. Using microprocessor power to generate additional simulated bus traffic decreases the microprocessor's speed at which other tasks are accomplished. System test results are therefore inherently erroneous, not only reflecting effects due to the additional bus traffic, but also effects attributable to the decreased microprocessor attention to routine and background tasks while in bus-traffic-simulation mode.

With an ongoing demand to increase digital data path (bus) throughput, there is a need for a testing circuit and method dedicated to generating additional bus traffic of any type which will further address the aforementioned problems, as well as other related problems. The present invention is directed to a circuit and method for performing the above-mentioned bus traffic generation operations while increasing availability and minimizing processing burden on existing bus access resources.

SUMMARY OF THE INVENTION

Various aspects of the present invention are directed to generating additional bus traffic, and in a more specific application to a circuit and method for testing additional digital data path loading in which state machine circuitry, a memory arrangement, and status and feedback circuit are used to generate any type of bus traffic and control the frequency of this traffic responsive to programmable commands.

Consistent with one specific example embodiment, the present invention is directed to a circuit arrangement for communicating test-traffic on a digital data path shared with other traffic sources. A first embodiment includes a data-generation circuit, a memory arrangement, state machine circuitry, and a status and feedback circuit. The memory arrangement stores a plurality of programmable commands indicating the type, pattern and behavior-in-time of the test-traffic. The data-generation circuit provides a data stream to the state machine circuitry; the state circuitry assembles portions of the data stream into test-traffic having type, pattern and behavior-in-time characteristics selected responsive to the programmable commands. Test-traffic is generated on the digital data path by the state circuitry. The status and feedback circuit monitors the digital data path and verifies the test-traffic against the data stream. A feedback signal is generated indicative of test-traffic quality or throughput.

In another aspect of the present invention, a computer system includes a test-traffic generator.

In another particular example embodiment, a method of generating test-traffic on a digital data path having at least one other traffic source is provided. A test-traffic source is coupled to the digital data path and a plurality of programmable commands, indicative of test-traffic type, pattern and behavior which are stored in a memory. A replicatable data stream is provided, portions of which are assembled into test-traffic having type, pattern and behavior-in-time selected in response to the programmable commands. Test-traffic is generated on the digital data path and monitored to verify against the data stream. A feedback signal is generated indicative of the test-traffic verification.

Other example embodiments of the present invention are respectively directed to various other related aspects including method, circuit, and system-based implementations of such processing.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
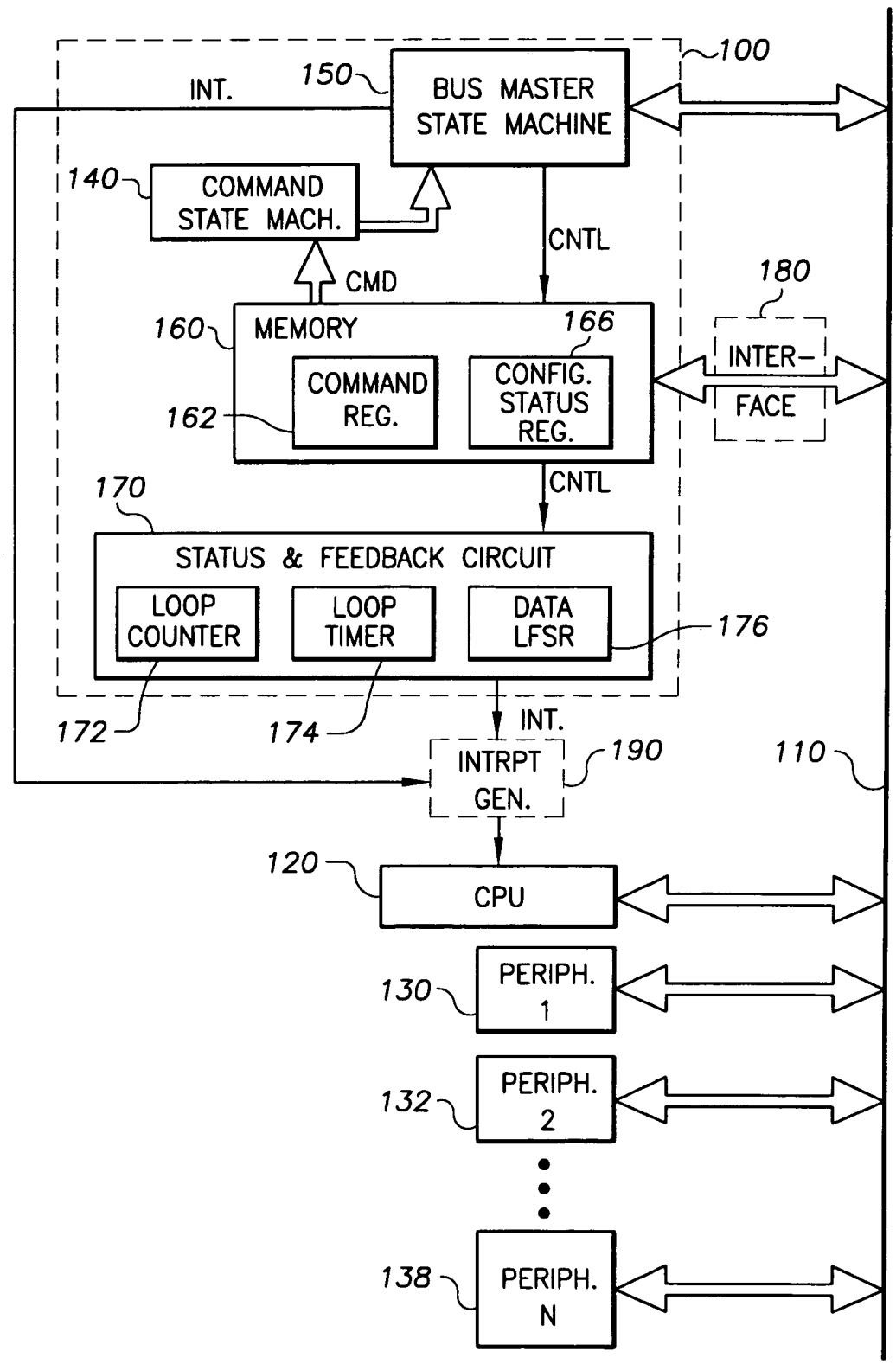
FIG. 1 is a diagram showing one example embodiment of a computer-based circuit having a data communications bus traffic generator arrangement, according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF VARIOUS EXAMPLE EMBODIMENTS

The present invention is believed to be highly applicable to processing arrangements in which data is transferred over a digital data path having a plurality of traffic sources, and testing methods thereof. The invention has been found to be particularly advantageous for design testing high-speed data transfer applications in which additional digital data path traffic is simulated through a test-traffic generator leading to improved system testing, and ultimately, improved system control and communication throughput between devices coupled to the digital data path.

The present invention is applicable to various parallel digital-data paths (including interfaces) implementations having multiple traffic sources, examples include among others: SSTL (stub series transceiver/terminated logic), RSL (Rambus Signaling Logic) interfaces, point-to-point proprietary protocol connections, processing arrangements using the Advanced Microcontroller Bus Architecture ("AMBA"), AMBA-Advanced Peripheral Bus ("APB"), high-speed busses such as the Advanced High-performance Bus ("AHB"), Advanced System Bus (ASB) standard, VLSI Peripheral Bus (VPB) bus, other types of ARM-based data processing arrangements, closely-connected applications in which the parallel data communication path intercouples two modules on a single-chip, and off-board high-speed communication between chips typically situated immediately adjacent each other on the same printed circuit board. Other embodiments of the present invention are directed to IBM's CoreConnect on-chip bus, Motorola's IP-bus, and other data high-performance bussing CPU arrangements as further exemplified below. While the present invention is not necessarily limited to AHB applications, an appreciation of various aspects of the invention is best gained through a discussion of examples in such an environment.

Consistent with a general embodiment, the present invention is implemented in a processing arrangement that includes a digital data path having multiple traffic sources, for which it is desirable to test the digital data path. The processing arrangement includes a traffic generator, operating as a functional block, specifically designed for the purpose of generating test-traffic on the digital data path. Including a functional block dedicated to digital data path test-traffic generation ensures that a test-traffic generator resource is widely available to system designers for the purpose of adding additional traffic to a digital data path for testing. System designers can then increase traffic, thereby offsetting digital data path bandwidth otherwise available to other (e.g., existing) traffic sources; such bus reallocation being useful for stress-testing processing arrangements to measure digital data path bandwidth margins, or to evaluate particular applications operations where communication path resources are further limited.

A traffic generator functional block includes a state machine circuitry portion, a memory arrangement portion, and a status and feedback portion. The memory arrangement portion is adapted to receive and store programmable commands and receive control information from a CPU which defines particular characteristics of test-traffic to be generated and/or traffic verification criteria. The state machine circuitry portion generates the test-traffic responsive to the programmable commands and provides direction to the status and feedback portion. The status and feedback portion monitors test-traffic and traffic generator operations, and provides feedback information to the CPU as necessary.

A particular aspect of the traffic generator includes a bus master state machine, a command memory arrangement, command state machine, and a status and feedback circuit. The command memory arrangement is adapted to receive programming commands from various sources (e.g., system processors and other devices), prioritize, buffer and provide the commands to the command state machine for execution. The bus master state machine is coupled to a digital data path (e.g., a bus) and adapted to arbitrate for control of the digital data path, write to and read from the digital data path as directed by the command state machine. Unlike conventional traffic sources, the bus master state machine is able to generate all types of test-traffic.

A status and feedback circuit is adapted to monitor the digital data path and produce feedback information indicating of digital data path traffic throughput and traffic quality. In one aspect of the present invention, an interrupt is generated when a programmed duration deadline is missed or a slave error response occurs, each indicating that digital data path test-traffic throughput is unacceptable. In another aspect, an interrupt or readable flag is generated when faulty read data is received.

The traffic generator generates test-traffic which is programmed to have selected characteristics associated with a device being simulated, including "traffic type", "pattern" and "traffic behavior-in-time". "Traffic type" differentiates traffic of various transfer or burst sizes. For example, burst sizes of 1, 2, 4, 8, 16 and 32 words per burst are common but other burst sizes can also be used. Some conventional traffic sources are only capable of generating traffic of one or two traffic types. One conventional traffic source, a microprocessor, generates digital data path traffic intermittently with other computing tasks. Generally for efficiency purposes, a microprocessor processes single-unit or four-word burst traffic types; whereas one example embodiment of a traffic generator of the present invention has capability to generate a broader range of programmable traffic types as needed to accurately simulate operations of another traffic source or load a digital data path.

"Traffic pattern" describes a sequence of traffic generator operations, each operation typically including a direction (e.g., read or write) and an address. An example of one traffic pattern is a write transfer immediately followed by a read transfer from the same address in a pattern comprising a sequence of two operations, each operation having a direction and address. However, a traffic pattern is not necessarily restricted to only read/write operations; for example a traffic pattern including a programmable pause is possible using a traffic generator according to the present invention. A pause is a period during which the traffic generator is idle. A design may wish to idle a traffic generator to simulate a traffic source (e.g., a microprocessor) performing other tasks other than traffic generation. Typically, conventional traffic sources cannot be programmed to pause, either because the conventional traffic source does not have such capability, or because the conventional traffic source cannot afford idle time away from its primary tasks.

"Traffic behavior-in-time" describes a frequency of generated bus traffic with respect to time, for example, by repeating a traffic pattern every $N^{th}$ digital data path cycles. A traffic generator can be programmed to repeat a traffic pattern at a specified frequency, and for a definable number of iterations through a counter function. Because a traffic generator of the present invention is dedicated to generating test-traffic, and is available continuously to a system designer, test-traffic type, pattern and behavior-in-time can be closely controlled through programmable commands, unlike "borrowing" existing conventional traffic sources, to accurately simulate new digital data path traffic. A system designer is able to model digital data more reliably and precisely using a dedicated test-traffic generator controlled via programmable commands which define traffic type, pattern, and behavior-in-time.

In one example embodiment, the command memory arrangement includes command registers to store the programmable commands. The order and type of these commands control the functionality of the traffic generator. Additional registers hold status measurement data, for example, counter and timer settings. Programmable commands are received from other devices within the system, for example a system processor circuit. An interface circuit coupled between the command arrangement and the digital data path, for example an AHB slave interface, is used to communicatively couple the various registers to the other devices within the system through which programmable commands are received.

The status and feedback (S&F) circuit includes a loop counter, loop timer and a data-generation circuit. The S&F circuit monitors the progress of the traffic generator and, in one example embodiment, generates an interrupt back to a processor (e.g., the processor from which control commands are received) if the traffic generator cannot complete all the commands within a specified time as timed by the loop timer, or if read data is incorrect. The loop counter counts instances on repeated commands.

The data-generation circuit provides a stream of data for use by the traffic generator. The traffic generator generates traffic for testing purposes, or test-traffic. Data is assembled, or packaged, into test-traffic as defined by the programmable commands, for example into bursts of a particular size. Bursts, arranged in particular patterns and communicated via the digital data path at selected frequencies for selected iterations, comprise test-traffic.

The stream of data used in creating the test-traffic need not convey any particular message; however, certain data stream characteristics are desirable, particularly for applications where digital data path test-traffic quality is of interest. Test-traffic quality encompasses whether test-traffic, actually generated, includes errors. Errors introduced due to digital data path constraints are indicative of digital data path bandwidth limitations and other associated problems. Generally, a data stream including variable data is desirable so that the same data is not continuously generated on the digital data path, for example as a data stream comprising a sequence of random, or pseudo-random binary numbers. Discerning errors in repetitive or identical data is more difficult.

Test-traffic quality is tested by verifying test-traffic against the data stream used to generate the test traffic. Another desirable data stream characteristic is an ability to replicate the data stream at a later time. One method for testing data quality is to generate test-traffic using a first data stream, write the data to a memory location using test-traffic over the digital data path, then read the data back from the memory location (again generating read test-traffic), and verify the received data against the first data stream. Errors are signaled with appropriate feedback information.

As one skilled in the relevant art will appreciate, the specific data used in this comparison is generally irrelevant for many applications, the important feature being access to the same data for generating the write test-traffic and for verifying the read test-traffic. In one example embodiment of the present invention, a repeatable sequence of binary data is available via memory arrangement integral to the traffic generator within which the sequence of binary data is stored. The memory can be accessed to retrieve a data stream for test-traffic generation, and accessed again to retrieve the data stream for verification processing. Data variability is achieved by storing a sequence having sufficient variety in data; or alternatively, by storing the data stream in segments, each segment in a unique addressable location. Data variety is accomplished by varying the starting address location from which a data stream is retrieved, or retrieving the data stream segments in a variable (but known) order.

In another example embodiment of the present invention, the data stream is not pre-stored, instead it is generated as needed. A linear feedback shift register (LFSR) is included in the data-generation circuit. The LFSR generates a data stream comprising pseudo-random numbers, thereby creating a data stream comprising non-identical data. For a particular input, an LFSR always generates an associated output, the output used as an input on the next iteration. Thereby, the LFSR produces the same order of pseudo-random numbers and the data stream is controllable and replicatable by seeding the LFSR with a known starting value to select a starting point within the fixed order for the data stream. A stream of LFSR-generated data is communicated to the digital data path by the bus master state machine, the data stream enabling the bus master state machine to maintain mastership (i.e., control) over the bus for a period of time appropriate to the bus traffic pattern the traffic generator is simulated.

In an alternative example embodiment of the present invention, "dummy" data is generated by another conventional means, for example by a random number generator, a pre-defined sequence stored in memory, or by other implementation used to create a data variety to avoid continually writing identical data onto the bus. Composition of the data message is unimportant in one example embodiment of the present invention, the traffic generator simply serving as a bus-using "placeholder" simulating bus communications, rather than actually passing relevant information. In an alternative embodiment, the traffic generator is used to communicate useful information over the bus consistent with a simulated bus traffic pattern and behavior.

The traffic generator serves to generate a programmable load of any communications traffic type on a system's communication infrastructure. Generally operating as an additional digital data path master/initiator, the traffic generator is fully programmable and can be used in a variety of testing modes. In one example embodiment, a traffic generator of the present invention is used to generate a programmable load on a communication infrastructure to facilitate measurement of system (e.g., communications infrastructure) design margins. For example, an evaluation of system performance is made to determine whether performance requirements are still met when the traffic generator causes an X% additional bus load of a specific pattern. Alternatively, a programmable traffic generator of the present invention is used to vary additional bus loading to determine a maximum additional bus load while maintaining system performance requirements within specifications.

In another example embodiment, a traffic generator acts as a temporary substitute for another traffic source simulating a quantity and timing of digital data path traffic that the other traffic source will generate when operable. For example, a generic traffic generator is added to a system, substituting for a future traffic source still in development. Using the traffic generator as a functional "place-holder" permits system building, simulation and testing to proceed much earlier in a design schedule. In yet another example embodiment of the present invention, the traffic generator is used to validate other components.

FIG. 1 illustrates a more particular example embodiment of a traffic generator 100 coupled to a digital data path (bus) 110. A processor 120 and a plurality of peripherals 130, 132 and 138 respectively, are also coupled to bus 110. Traffic generator 100 includes a command state machine 140, bus master state machine 150, command memory arrangement 160, and status and feedback circuit 170. Command memory rearrangement 160 is adapted to receive from users (e.g., system processor 120 and peripheral devices 130, 132 and 138) programmable commands via interface 180. Command memory arrangement includes command registers 162 for prioritizing and buffering (i.e., storing) programmable commands, and configuration/status registers 166 for holding traffic generator setting information such as loop counter quantities and loop timer times. Commands are prioritized based on the type and order of commands received by command memory arrangement 160.

Command memory arrangement 160 provides command instructions for execution to a command state machine 140, which in turn, directs bus master state machine 150 to acquire and control the digital data path for communications with other devices also coupled to the bus responsive to the command state machine. Bus master state machine 150 is coupled to bus 110 and adapted to generate all types of traffic. Bus master state machine 150 feeds control information back to command memory arrangement 160 for storage and use in configuration/status registers 166.

Status and feedback circuit 170 includes loop counter 172, loop timer 174 and data linear feedback shift register (LFSR) 176 functional blocks. Control settings for the functional blocks within status and feedback circuit 170 are obtained from configuration/status registers 166 of command memory arrangement 160 as programmed by users. Status and feedback circuit 170 is adapted to monitor bus 110 and cause appropriate feedback signals, for example interrupts to be generated by interrupt generator 190, indicative of bus traffic throughput. In one example embodiment, interrupts are caused to be generated based on transfer status (e.g., when a slave error response occurs, or when faulty read data is received), and due to time behavior excursions (e.g., when a programmed duration deadline is missed). Compliant with its configuration, status and feedback circuit 170 is adapted to monitor bus 100 for requested traffic and report back to a CPU circuit 120 if a bus traffic generation failure is detected. Using this feedback from the bus traffic generation circuit, the CPU circuit determines what, if any, action is required and responds by redirecting the bus traffic generation circuit for further transmission of digital data of the same type and/or other digital data types. In addition to status and feedback circuit 170, bus master state machine 150 can signal interrupt generator 190 to produce an interrupt back to processor 120. Other example traffic generator embodiments implement feedback signaling using other conventional methods known to those skilled in the relevant art.

Figure 2:
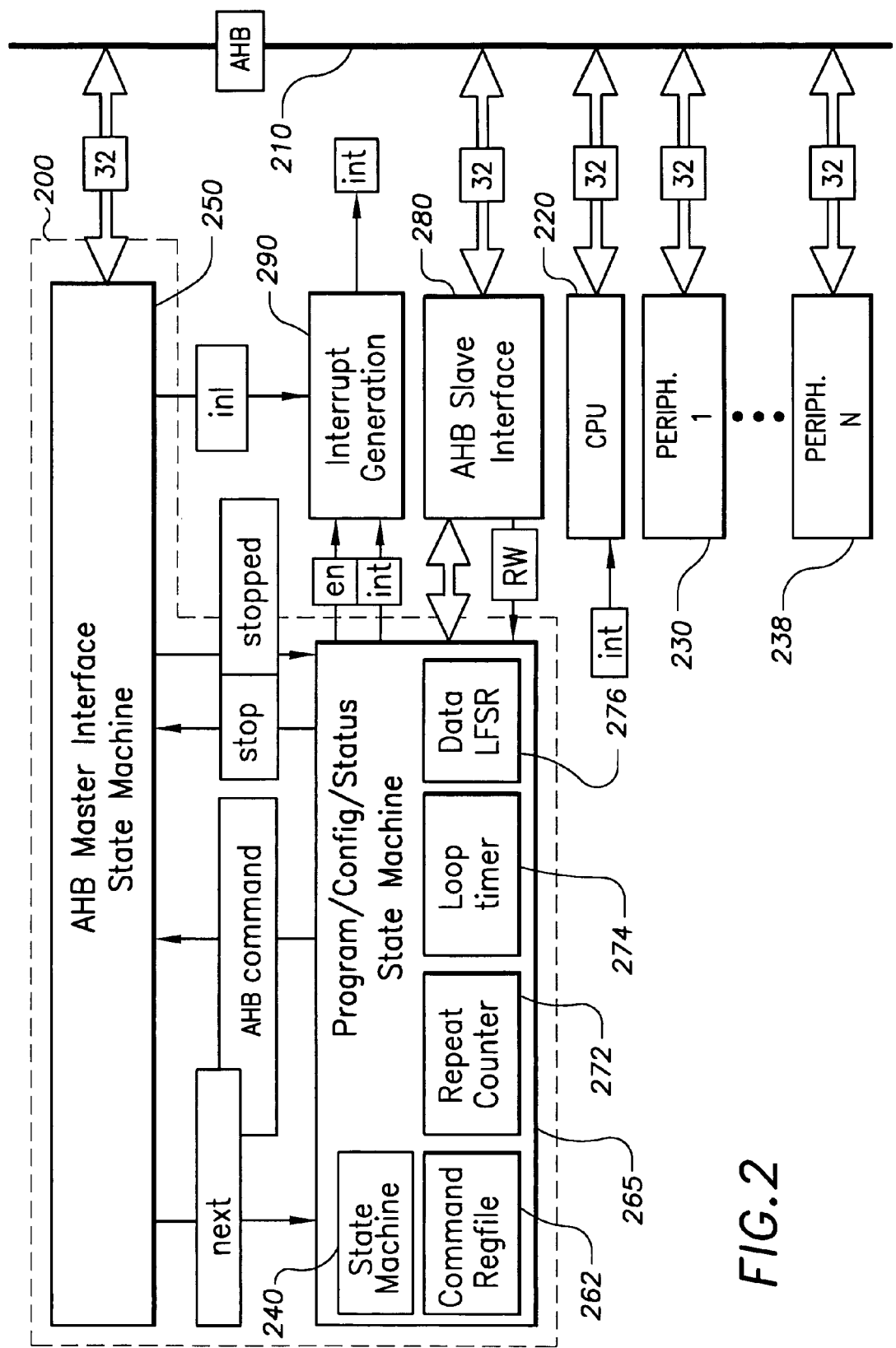
FIG. 2 is a diagram showing a more particular example embodiment of a computer-based circuit having a data communications bus traffic generator arrangement, according to the present invention.

FIG. 2 shows another more particular example embodiment of a traffic generator 200 of the present invention implemented in a system utilizing a 32 bit high-speed Advanced High-performance Bus ("AHB") 210 protocol. Devices in FIG. 2 having functions comparable to devices illustrated in FIG. 1, are similarly numbered in FIG. 2. A CPU 220 and a plurality of peripherals, 230 through 238 respectively, are also coupled to bus 210. Traffic generator 200 includes an AHB master interface state machine 250 and a program/configuration/status state machine functional block 265. State machine functional block 265 includes state machine 240, command register file 262, and status and feedback functional blocks repeat counter 272, loop timer 274 and data linear feedback shift register (LFSR) 276.

State machine functional block 265 is adapted to receive from users (e.g., system processor 220 and peripheral devices 230 and 238) programmable commands via AHB bus 210 and AHB slave interface 280. Command register file 262 prioritizes and buffers (i.e., stores) programmable commands, as well as traffic generator setting information (e.g., loop counter and timer quantities and times respectively). Commands are prioritized based on order of commands received by state machine functional block 265.

State machine functional block 265 controls bus traffic generation, processing received programmed commands stored in command register file 262, and presenting AHB master interface state machine 250 AHB command instructions for execution. AHB master interface state machine 250 converts a given command instruction to a corresponding behavior to acquire and/or control AHB bus 210, as well as "stop" instructions to cease mastery over bus 210. AHB master interface state machine 250 is coupled to AHB bus 210 and adapted to generate all types of traffic. AHB master interface state machine 250 feeds control information and status, for example "next" instructions and "stopped" indications, back to state machine functional block 265 for program control and communication status evaluation. Control settings for the status and feedback functional blocks within state machine functional block 265 are obtained via AHB slave interface 280. Bus 210 status, when subject to AHB master interface state machine 250 control, is also read back via AHB slave interface 280 into state machine functional block 265 for evaluation.

Additionally, state machine functional block 265 controls interrupt generation to enable or block interrupts in exceptional conditions (e.g., unexpected read data). In one example embodiment, interrupts are generated based on transfer status (e.g., when a slave error response occurs, or when faulty read data is received), and time behavior (e.g., when a programmed duration deadline is missed). Interrupts are fed back to processor 220 as is conventional practice.

The circuit blocks illustrated in FIGS. 1 and 2 generically represent circuits that are implemented in discrete component logic, semi- or fully-programmable logic, or in software, using HDL tools for example. These blocks can be commercially available and/or application-specific or customer-specific functional blocks. Each of these blocks is implemented according to an applicable standard to effect proper communication using a master/slave relationship. The master/slave communication can be implemented in a number of ways, the master being the device or accessing circuit block initiating the communication (e.g., a traffic source) and the slave being the targeted respondent, or a bus-coupled circuit block, of the initiated communication in accordance with the applicable standard.

The present invention should not be considered limited to the particular examples described above. Various modifications, equivalent processes, as well as numerous structures to which the present invention may be applicable fall within the scope of the present invention, as fairly set forth in the appended claims.

What is claimed is:

1. A circuit arrangement for generating test-traffic on a digital data path having at least one other traffic source, comprising:
a data-generation circuit adapted to provide a first data stream;
a memory arrangement adapted to buffer a plurality of programmable commands, the programmable commands indicative of at least one of test-traffic type, pattern and behavior-in-time;
state machine circuitry coupled between the memory arrangement, the data-generation circuit and the digital data path, the state machine circuitry adapted to assemble portions of the first data stream into test-traffic wherein at least one of type, pattern and behavior-in-time is selected responsive to the programmable commands, and further adapted to generate test-traffic on the digital data path; and
a status and feedback circuit adapted to monitor the digital data path for test-traffic and generate a feedback signal indicative of at least one of test-traffic throughput and test-traffic quality.

2. The circuit arrangement of claim 1, wherein
the state machine circuitry includes a command state machine and a bus master state machine, the command state machine being coupled to the memory arrangement and data-generation circuit, and adapted to direct the bus master state machine to assemble portions of the first data stream into test-traffic having pre-defined type, pattern and behavior-in-time responsive to the programmable commands, and the bus master state machine is coupled to the digital data path and adapted to communicate the test-traffic onto the digital data path responsive to the command state machine.

3. The circuit arrangement of claim 1, wherein the state machine circuitry is adapted to assemble portions of the first data stream into a test-traffic type selected from a group consisting of 1, 2, 4, 8, 16, 32, and 64 words per burst.

4. The circuit arrangement of claim 1, wherein the state machine circuitry is adapted to assemble portions of the first data stream into a test-traffic type selected from a group consisting of other than 1, 2, 4, 8, 16, 32, and 64 transfers per burst.

5. The circuit arrangement of claim 1, wherein the state machine circuitry is further adapted to receive the first data stream from the data-generation circuit without generating test-traffic on the digital data path.

6. The circuit arrangement of claim 1, wherein the state machine circuitry is adapted to pause in response to programmable commands.

7. The circuit arrangement of claim 1, further comprising a bus interface circuit coupled between the memory arrangement and the digital data path, the bus interface circuit adapted to pass programmable commands received via the digital data path to the memory arrangement.

8. The circuit arrangement of claim 1, wherein the first data stream is a repeatable sequence of binary data.

9. The circuit arrangement of claim 8, wherein the data-generation circuit is a second memory arrangement, the first data stream being stored in the second memory arrangement.

10. The circuit arrangement of claim 8, wherein the first data stream comprises a sequence of pseudo-random numbers.

11. The circuit arrangement of claim 10, wherein the data-generation circuit is a second memory arrangement, the first data stream being stored in the second memory arrangement.

12. The circuit arrangement of claim 10, wherein the data-generation circuit is a linear feedback shift register (LFSR) circuit, the first data stream comprising a sequence of LFSR values.

13. The circuit arrangement of claim 12, wherein the state machine circuitry is configured and arranged to seed the LFSR and control content of the first data stream.

14. The circuit arrangement of claim 13, wherein the status and feedback circuit is further adapted to verify monitored test-traffic against corresponding LFSR values, and the feedback signal being an interrupt generated indicative of the test-traffic verification.

15. The circuit arrangement of claim 1, wherein the status and feedback circuit is further adapted to verify monitored test-traffic against a corresponding first data stream, and the feedback signal being an interrupt generated indicative of the test-traffic verification.

16. The circuit arrangement of claim 15, wherein the memory arrangement includes command registers adapted to store programmable commands, configuration registers adapted to store traffic generation process control information and status registers adapted to store test-traffic verification information.

17. The circuit arrangement of claim 1, wherein the status and feedback circuit includes a counter adapted to specify a number of command repetitions, and a loop timer adapted to specify a period within which a set of programmable commands must execute.

18. The circuit arrangement of claim 1, wherein the digital data path is an AHB protocol bus.

19. A computer system, comprising:
a digital data path;
a plurality of traffic sources, each traffic source coupled to the digital data path and adapted to communicate non-test-traffic onto the digital data path; and
a circuit arrangement for generating test-traffic coupled to the digital data path, the circuit arrangement including,
a data-generation circuit adapted to provide a first data stream,
a memory arrangement adapted to buffer a plurality of programmable commands, the programmable commands indicative of at least one of test-traffic type, pattern and behavior;
state machine circuitry coupled between the memory arrangement, the data-generation circuit and the digital data path, the state machine circuitry adapted to assemble portions of the first data stream into test-traffic wherein at least one of type, pattern and behavior-in-time is selected responsive to the programmable commands, and further adapted to generate test-traffic on the digital data path; and
a status and feedback circuit adapted to monitor the digital data path for test-traffic and generate a feedback signal indicative of at least one of test-traffic throughput and test-traffic quality, wherein at least one of the plurality of traffic sources is a processor circuit.

20. The circuit arrangement of claim 19, wherein the data-generation circuit is a linear feedback shift register (LFSR) circuit, the first data stream consists of a sequence of pseudo-randomly generated binary numbers representing LFSR values.

21. The circuit arrangement of claim 20, wherein the status and feedback circuit is further adapted to verify monitored test-traffic against a corresponding first data stream, and the feedback signal is an interrupt generated indicative of the test-traffic verification.

22. A method of generating test-traffic on a digital data path having at least one other traffic source, comprising:
coupling a dedicated test-traffic source to the digital data path;
providing a first data stream, the first data stream being replicatable;
storing a plurality of programmable commands, the programmable commands indicative of at least one of test-traffic type, pattern and behavior;
assembling portions of the first data stream into test-traffic wherein at least one of type, pattern and behavior-in-time is selected responsive to the programmable commands;
generating test-traffic on the digital data path;
monitoring the digital data path for the test-traffic;
verifying the monitored test-traffic against a corresponding first data stream; and
generating a feedback signal indicative of the test-traffic verification.

23. The method of claim 22, wherein the first data stream is a sequence of pseudo-random numbers each representative of a linear feedback shift register (LFSR) value.

24. The method of claim 23, further comprising, verifying monitored test-traffic against a corresponding LFSR value, wherein the feedback signal is an interrupt indicative of each test-traffic verification.

25. The method of claim 22, further comprising:
counting a pre-determined number of command-execution repetitions;
timing each command-execution repetition against an associated programmable period; and
generating a feedback signal indicative a command-execution repetition exceeding the associated programmable period.

26. The method of claim 22, wherein the digital data path is an AHB protocol bus.

27. The method of claim 26, wherein test-traffic type is one of a group consisting of 1, 2, 4, 8, 16, 32, and 64 transfers per burst.

28. A circuit arrangement for generating test-traffic on a digital data path having at least one other traffic source, comprising:
means for coupling a dedicated test-traffic source to the digital data path;
means for providing a first data stream, the first data stream being replicatable;
means for storing a plurality of programmable commands, the programmable commands indicative of at least one of test-traffic type, pattern and behavior;
means for assembling portions of the first data stream into test-traffic wherein at least one of type, pattern and behavior-in-time is selected responsive to the programmable commands;
means for generating test-traffic on the digital data path;
means for monitoring the digital data path for the test-traffic;
means for verifying the monitored test-traffic against a corresponding first data stream; and
means for generating a feedback signal indicative of the test-traffic verification.

* * * * *